United States Patent [19]

Majima et al.

[11] Patent Number: 5,366,599

[45] Date of Patent: Nov. 22, 1994

[54] METHOD OF SELECTIVE RECOVERY OF FERROUS AND NONFERROUS METALS FROM INDUSTRIAL WASTES AND SCRAP HOME ELECTRIC APPLIANCES

[75] Inventors: Hiroshi Majima, Kobe; Satoru Nigo, Okayama, both of Japan

[73] Assignee: Dowa Iron Powder Co., Ltd., Okayama, Japan

[21] Appl. No.: 34,119

[22] Filed: Mar. 22, 1993

[30] Foreign Application Priority Data

Mar. 30, 1992 [JP] Japan .................................. 4-105454
Feb. 12, 1993 [JP] Japan .................................. 5-47349

[51] Int. Cl.$^5$ ............................................. C25C 1/12
[52] U.S. Cl. .................................. 204/106; 75/740; 423/32
[58] Field of Search ...................... 204/106; 423/32; 75/740, 732, 726

[56] References Cited

U.S. PATENT DOCUMENTS

| | | | |
|---|---|---|---|
| 3,832,162 | 8/1974 | Smith | 75/63 |
| 3,967,957 | 7/1976 | Fonseca | 75/103 |
| 5,176,802 | 1/1993 | Duyvesteyn et al. | 204/106 |

OTHER PUBLICATIONS

Kuhn et al, "Anaconda's Arbiter Process for Copper", CIM Bulletin, Feb., 1974, pp. 62–73.
Iwase et al, "A feasibility study for the removal of copper from solid ferrous scrap", "steel research 62", Jan., 1991 No. 6, pp. 235–239.
Jimbo et al, "The Refining of Copper From Ferrous Scrap", I&SM, Aug. 1988, pp. 20–23.
Halpern et al, "Kinetics of the Dissolution of Copper in Aqueous Ammonia", Journal of the Electrochemical Society, Oct. 1958, pp. 422–428.

Primary Examiner—John Niebling
Assistant Examiner—Brendan Mee
Attorney, Agent, or Firm—Frishauf, Holtz, Goodman & Woodward

[57] ABSTRACT

After optional preliminary treatment, solid wastes are processed in accordance with the flowsheet FIG. 1: first, Cu is leached selectively with a leaching solution containing Cu(II) ammine as a leachant according to the autooxidation or the autocatalytic action which proceeds depending on the equations:

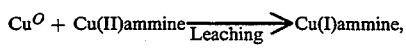

and

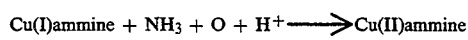

and the Cu(II) ammine concentrated in the leaching solution is extracted with a solvent Lix-54; thereafter, $Cu^{2+}$ is stripped so that it moves into a Cu electrolyte and Cu electrowinning is performed to have metallic Cu deposited at the cathode, with the total process being carried out in a closed circuit. By this process, copper and other nonferrous metals can be selectively recovered from motor scrap and shredded solid wastes such as abandoned automobiles and home electric appliances in a simple and economical manner.

6 Claims, 1 Drawing Sheet

METHOD OF SELECTIVE RECOVERY OF FERROUS AND NONFERROUS METALS FROM INDUSTRIAL WASTES AND SCRAP HOME ELECTRIC APPLIANCES

BACKGROUND OF THE INVENTION

This invention relates to a method of selectively recovering valuable metals from metal-rich industrial solid wastes and scrap home electric appliances, in particular, those processed wastes which contain both iron and nonferrous metals (chiefly copper). More specifically, this invention relates to a method by which valuable iron, copper and other nonferrous metals can be selectively recovered in a simple and economical manner from motor scrap, in particular, small motor's scrap, or shredded automobiles and home electric appliances, which are disposed of in large tonnage every year. Such industrial solid wastes and scrap home electric appliances have a high content of both ferrous and nonferrous metals and should be used as precious industrial raw materials for countries in which natural resources are scarce, such as Japan. However, in the absence of established economical processing methods that are competitive on the market, those industrial solid wastes and scrap home electric appliances are not currently used as a source of ferrous or nonferrous raw materials but are simply disposed of as landfill materials.

With the recent advances in the industries of automobiles, home electric appliances and office-automation equipment, various small-sized motors have come to be used in a broad range of fields. Most of the wastes that originate from such small motors are disposed of together with abandoned large motors that are derived from the heavy-industry sector. In total, the quantities of motor scrap that is annually disposed of after use are immense.

Of the two types of motor scrap, the scrap of large motors is disassembled manually and, after the copper wires are removed fairly easily, the remainder is selectively recovered as waste copper and iron scrap. However, the product recovered in this way accounts for only a very small portion of the total quantity of motor scrap that is disposed of.

Various methods have been proposed for selective recovery of copper and iron from motor scrap and they include melting copper as a copper-aluminum alloy by treatment with molten aluminum, as well as passiveting iron with nitric acid so as to achieve selective leaching of copper. However, none of the methods proposed so far are considered to be effective for the motor scrap of interest and, hence, have not been commercialized.

Under the circumstances, most of the motor scrap are disposed of by sanitary landfill without being processed in any way. However, as huge amounts of motor scrap are discharged every year, it is becoming increasingly difficult to find suitable landfill sites, thus presenting a serious social problem.

Entirely the same problem has occurred with shredded wastes of automobiles and home electric appliances such as washing machines and refrigerators. A recent method for processing such industrial solid wastes or scrap home electric appliances consists of shredding, followed by combined magnetic separation and handsorting to recover iron scrap, as well as disposal by sanitary landfill of shredder dust of low density which is chiefly composed of plastics, paper, fabrics, etc. In magnetic separation, some of the mixtures that are based on ferrous and/or nonferrous metals are contained in the nonmagnetics and yet they cannot be recovered by handsorting. Examples of such difficult-to-recover solid wastes are shredded enamelled copper wires and metallic machines coated with insultation paint. In the absence of effective processing techniques, these solid wastes are just left as they are or dumped at suitable sites.

The magnetics that have been recovered from the shredded solid wastes by magnetic separation include not only those which can be separated from iron scrap by subsequent handsorting but also dust, as well as aggregates of ferrous and nonferrous metals that adhere to each other, and mixtures thereof. The undersize of nonmagnetics contains copper-rich ferrous/nonferrous mixed scrap. Further, the heavy fractions recovered by air classification contain copper, aluminum and iron and are important valuable metal resources with comparatively small particle sizes. Some of these are recoverable as electric wire scrap but their quantity is extremely small. Thus, except for iron scrap, no appropriate techniques for processing industrial solid wastes and scrap home electric appliances have been known and there is a strong need to establish an effective system for their recycling.

Among the industrial solid wastes and scrap home electric appliances described hereinabove, motor scrap of common grades is chiefly composed of copper and iron and, among the shredded solid wastes also mentioned above, the inventors of the present invention are particularly interested in mixtures of iron and copper or other nonferrous metals. Clearly the development of an effective method of processing those industrial solid wastes and scrap home electric appliances is urgent for countries which are heavily dependent on overseas countries for the supply of raw mineral ores of ferrous and nonferrous metals, such as Japan. However, in view of the low price of the wastes to be processed, it is necessary to develop a process that is sufficiently inexpensive and convenient to warrant its commercial application.

Under the circumstances, the present inventors conducted intensive studies in order to develop and establish an effective and appropriate method for processing metallic industrial solid wastes and scrap home electric appliances that is simple to operate, that requires lower materials and energy costs, and that yet has a large disposal capacity. The present invention has been accomplished as a result of these studies.

SUMMARY OF THE INVENTION

In its first aspect, the method of the present invention is intended to be applied to the scrap of small motors or clad steel containing copper and copper alloys. It comprises the following steps: heating or shot blasting the scrap or clad steel to remove or destroy the enamel coat on the copper wires so that they become amenable to leaching; depositing the scrap or clad steel in a leaching tank containing a leaching solution that uses Cu(II) ammine ions as a leachant; circulating the leaching solution by a suitable method such as penetration or spraying so that copper will selectively dissolve out in the leaching solution while, at the same time, part of the leaching solution is withdrawn from the circulating system either continuously or intermittently (preferably at periodic intervals); extracting the withdrawn leaching solution with a solvent so as to recover the copper content of that solution. Alternatively, the residue is filtered off from the leaching solution and, thereafter, ammonia is released from the system using heated steam or air, thereby regenerating the leaching solution and recovering copper as hydroxide in the precipitate.

In whichever method, there is no need to use a special oxidizer or install a separate oxidizing facility and one has only to bring the circulating leaching solution into contact with air or oxygen for regenerating its ability to leach out copper and other ammine complex forming nonferrous metals.

A similar approach can be taken to selectively recover iron and nonferrous metals from the ferrous and nonferrous mixture in shredded solid wastes. The shredded product is optionally heated to remove the oil content, coatings, etc. to render the nonferrous metals present to be easily leachable; the product is then deposited in a leaching tank containing a leaching solution that uses Cu(II) ammine as a leachant; the leaching solution is circulated by a suitable method such as penetration or spraying so that copper, zinc and other ammine complex forming nonferrous metals will selectively dissolve out in the leaching solution. As in the case of processing motor scrap, part of the leaching solution may be withdrawn from the circulating system and extracted with a solvent, thereby recovering the nonferrous metals of interest while regenerating the leaching solution.

DETAILED DESCRIPTION OF THE INVENTION

Figure 1:
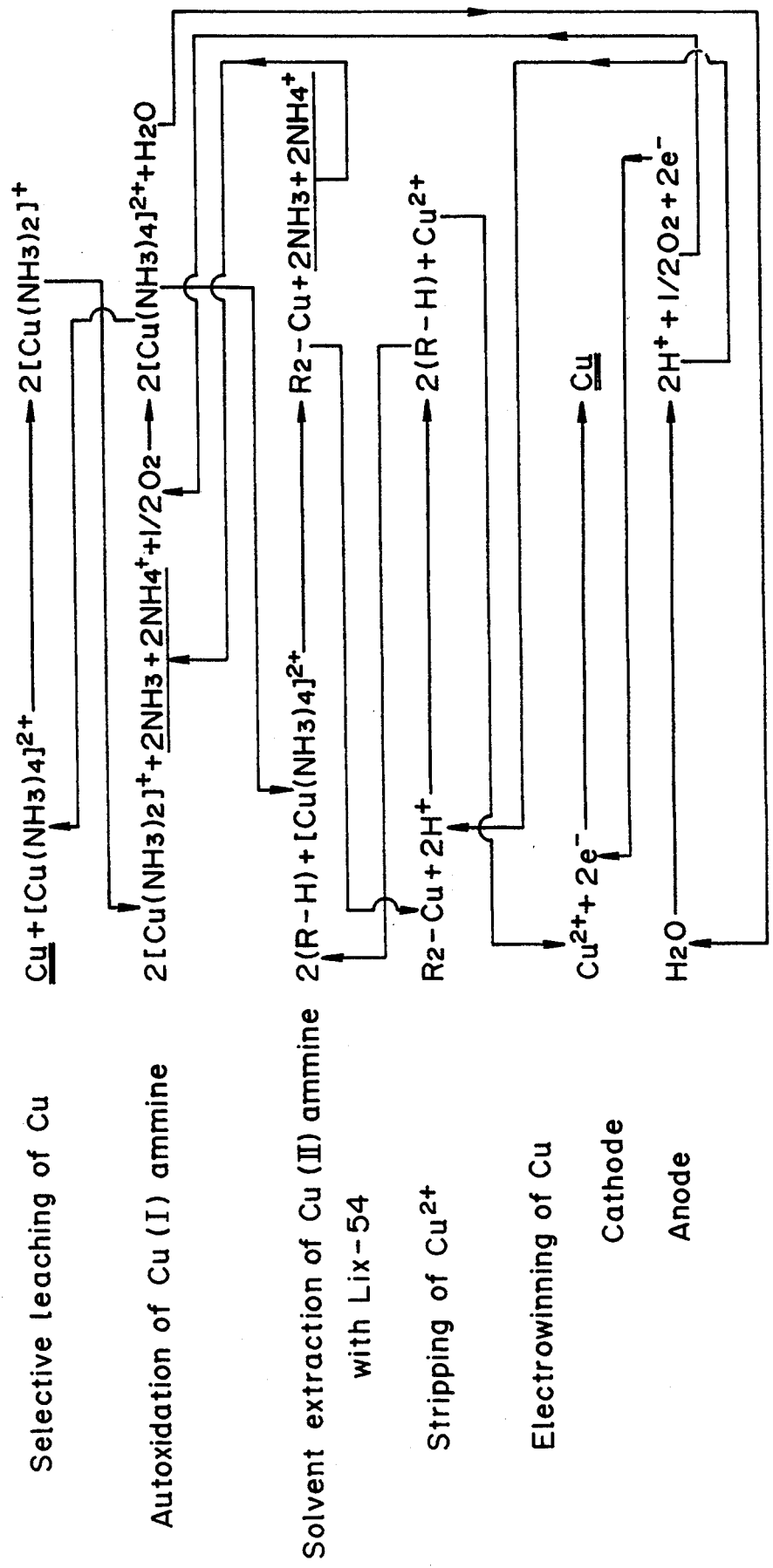
FIG. 1 is a flowsheet for the selective recovery of ferrous and nonferrous metals in a closed circuit that is suitable for commercial application of the method of the present invention.

Implementation of the method of the present invention starts with an optional step, in which small motor's scrap or shredded solid wastes that are based on a mixture of ferrous and nonferrous components are subjected to a preliminary treatment for enhancing the leachability of copper by either heating or shot blasting. This treatment is primarily intended not only for destroying the enamel coat on copper wires and other components that have high resistance to leaching but also for removing the oil content so as to enhance the leachability of ammine complex forming nonferrous metals; hence, the preliminary treatment need not be performed on articles that do not contain enamelled copper wires, say, bare conductors. This is why the step of preliminary treatment is "optional" for the method of the present invention.

Heating may be performed in air atmosphere at a temperature of 823 K (550° C.) for 20 min. Shot blasting may be performed on coil windings of the enamelled copper wire, against which 500 g of iron balls (under 22 and over 60 mesh) are blasted with a forced air at a pressure of 490 kPa over a distance of 145 mm, thereby stripping the enamel coat on one side of the wire.

After optionally performing the preliminary treatment described above, the article of interest is immersed in a leaching tank, which is supplied with the leaching solution in order to leach copper or any other nonferrous metals present as said leaching solution is circulated. The leaching solution may be an oxidizing aqueous solution of Cu(II) ammine. Because of the use of this oxidizing solution, one may say that the method of the present invention is similar to the conventional technique of ammonia leaching using oxygen as an oxidizer but the two methods are entirely different in terms of the operating theory. In the conventional method, the article to be processed which is in a powder form is placed in an autoclave and leached at elevated temperature and pressure under vigorous agitation and this is the basic conditions necessary for allowing oxygen to reach every part of the surface of the article to be processed. In contrast, if the article to be processed is bulky and if it is difficult to achieve rapid transport of the oxidizer within the leaching tank by agitation as in the case of the present invention, it is necessary to accelerate the leaching rate by increasing the concentration of the oxidizer. The Cu(II) ammine fits this purpose. The mechanism behind the oxidation by oxygen is entirely dissimilar to the mechanism of oxidation by Cu(II) ammine.

In the method of the present invention, the concentration of Cu ammine ions in the leaching solution will increase gradually as the circulation of the solution progresses; however, the Cu(II) ammine containing leaching solution to be first supplied to the leaching tank can be readily prepared by mixing copper sulfate, aqueous ammonia and ammonium sulfate in appropriate proportions. Preferred leaching solution to be first supplied to the leaching tank may be an aqueous alkaline solution having a pH value of 8-11, preferably 8.3-10.3 and containing 0.2-1.5 mol/L of $Cu^{2+}$, 1.0-7.0 mol/L of $NH_3$ and 0.1-13 mol/L of $NH^{4+}$. Particularly preferred ranges for the proportions of the three ingredients are as follows, with the concentration of copper sulfate being assumed as 0.5 mol per liter (liter is hereunder abbreviated as "L"): 0.2-0.8 mol/L of ammonium sulfate when the concentration of ammonia is 3 mol/L; 0.3-0.7 mol/L of ammonium sulfate when the concentration of ammonia is 5 mol/L; and 0.7-1.3 mol/L of ammonium sulfate when the concentration of ammonia is 7 mol/L.

Cu(II) ammine $[Cu(NH_3)_4]^{2+}$ will form in the leaching solution that is prepared by the process described in the preceding paragraph and it will leach copper by the following reaction scheme:

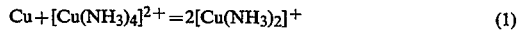

$$Cu + [Cu(NH_3)_4]^{2+} = 2[Cu(NH_3)_2]^+ \quad (1)$$

If other metals M, such as Zn, Ni and Co, that form stable divalent ammine complexes are contained in the article to be processed, M will be leached by the following reaction scheme:

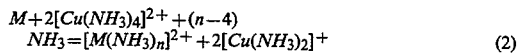

$$M + 2[Cu(NH_3)_4]^{2+} + (n-4)NH_3 = [M(NH_3)_n]^{2+} + 2[Cu(NH_3)_2]^+ \quad (2)$$

Thus, in the method of the present invention which uses Cu(II) ammine as a leachant from the very beginning of the process, the rate of reaction for leaching nonferrous metals such as Cu, Zn, Ni and Co that will form stable ammine complexes can be accelerated and, in this regard, the method is dissimilar to the conventional approach of ammonia leaching which uses dissolved oxygen in solution as an oxidizer.

The Cu(I) ammine $[Cu(NH_3)_2]^+$ which has been produced by reactions according to schemes (1) and (2) can be immediately reverted to Cu (II) ammine $[Cu(NH_3)_2]^+$ according to the following scheme by bringing the aqueous solution of interest into contact with air:

$$2[Cu(NH_3)_2]^+ + 4NH_3 + 1/2O_2 + 2H^+ = 2\text{-}[Cu(NH_3)_4]^{2+} + H_2O \quad (3)$$

The conventional ammonia leaching method differs substantially from the method of the present invention in the following two points: copper sulfate is not contained in the leaching solution; and the solution is not brought into positive contact with air outside the leaching tank. Stated more specifically, the conventional ammonia leaching method does not include the step of regenerating Cu(II) ammine rapidly by giving momentum to the progress of reaction (3) and, hence, the reaction rate is so slow, as to limit the commercial applicability of the method considerably. On the other hand, the present inventors added a substantial amount of copper sulfate to the leaching solution and adopted the step of oxidizing Cu(I) ammine to Cu(II) ammine rapidly by withdrawing part of the circulating solution from the leaching tank and bringing it into positive contact with air outside the vessel; as a result, the inventors succeeded in developing the method of the present invention which is highly adapted for commercialization.

The Cu(I) ammine is colorless whereas the Cu(II) ammine exhibits a blue color. If the leaching solution in the leaching tank that has become colorless on account of the formation of Cu(I) ammine is brought into contact with air by a suitable method such as spraying or free fall of the solution outside the tank, the solution will turn blue almost instantaneously, which is visual evidence for the very rapid progress of the reaction according to scheme (3). Noting this point, the present inventors adopted the step of accelerating the reaction of scheme (3) by bringing the circulating solution into positive contact with air and it may be considered to be one of the important features of the claimed method of the present invention. Needless to say, one can use oxygen instead of air in proceeding the reaction of oxidizing Cu(I) ammine into Cu(II) ammine, if one wants.

If ammonia and ammonium salts are contained in adequate amounts in the leaching solution in which copper has been leached in the manner described above, the reaction for leaching ammine complex forming nonferrous metals such as Cu and Zn will proceed as an autocatalyzed reaction.

The following examples are provided for the purpose of further illustrating the present invention but should in no way be taken as limiting.

EXAMPLE 1

This example shows the results of a basic experiment conducted to demonstrate the principle of the reaction involved in the method of the present invention.

An enamelled copper wire (2.5 mm$^\phi$) weighing 7.8 kg and an iron wire weighing 1 kg were used as samples. They were heated in air at 550° C. for 30 min to burn away the enamel coat. After cooling, the samples were deposited in a leaching tank having an inner capacity of 10 L that was equipped with a grate on the bottom. A leaching solution (10 L) composed of 0.5 mol of copper sulfate (CuSO$_4$), 5.0 mol of ammonia (NH$_3$) and 1.0 mol of ammonium sulfate [(NH$_4$)$_2$SO$_4$] was circulated in the leaching tank by overhead spraying through a perforated nozzle at a spray rate of 12 L/min. Upon 6-hour leaching, the concentration of Cu(II) ammine which was initially 30 g/L increased to 137 g/L, indicating that at least 1 kg of the copper wire dissolved out in the leaching solution. There was no indication of the dissolution of the iron wire.

The Cu(I) ammine ions that formed in the solution on account of Cu leaching were oxidized upon contact with air as the circulating solution was sprayed from above the tank, whereby those ions were reverted to Cu(II) ammine ions that made a second contribution to the leaching of copper.

COMPARATIVE EXAMPLE 1

The procedure of Example 1 was repeated using 10 L of a leaching solution of the same composition as adopted in Example 1 except that it did not contain copper sulfate. This means that the known method of ammonia leaching was practiced under the conventional standard conditions. Upon 6-hour leaching, the concentration of Cu(II) ammine increased to 3.1 g/L, indicating that the copper wire dissolved out in an amount of only 0.03 kg.

EXAMPLE 2

This example also shows the results of a basic experiment conducted under the principle of the reaction involved in the method of the present invention.

Samples of the same species and amounts as used in Example 1 were shot blasted to destroy part of the enamel coat on the copper wire. The samples thus treated were deposited in a leaching tank, in which 20 L of a leaching solution of the same composition as used in Example 1 was circulated at a flow rate of 8 L/min for effecting leaching by upward-flow penetration. During the leaching process, the circulating solution was left to flow down under gravity in air but no other positive oxidizing step was adopted.

After 6-hour leaching, the concentration of Cu(II) ammine in the leaching solution increased to 134 g/L, indicating the dissolution of copper in an amount of ca. 2 kg. To verify this, the residue was taken out of the leaching tank after the end of reaction, washed with water and weighed; the weight of the copper wire was found to have decreased from the initial 7.8 kg to 5.6 kg. On the other hand, the weight of the iron wire did not change at all.

EXAMPLE 3

This example shows the results of actual application of the method of the present invention to the scrap of small motors.

After heating at 550° C. for 30 min, 100 kg of small motor's scrap was deposited in a leaching tank having a capacity of 0.5 m$^3$ (800 mm$^\phi \times$ 1,000 mm). In a separate step, 350 L of a leaching solution composed of 0.5 mol of copper sulfate, 7 mol of ammonia and 1 mol of ammonium sulfate was provided and circulated in the leaching bath at room temperature at a flow rate of 50 L/min for affecting leaching by upward-flow penetration.

During the leaching process, the circulating solution was left to flow down under gravity through the circulation pipe but no other oxidizing step was adopted.

Eight hours after the start of its circulation, the concentration of Cu(II) ammine in the leaching solution reached 135 g/L but it did not increase any further. Hence, one half the volume of the leaching solution was replaced by a fresh one and the circulation and leaching process was continued. When 15 hours passed after the start of leaching operation, the concentration of Cu(II) ammine in the solution would not increase any longer.

Since the reaction may well be considered to have ended at that time, the amount of copper that dissolved out in the solution during the reaction period Was measured and it was found to be 7.3 kg. After the end of reaction, the sample was recovered from the residue in the tank and melted to form an ingot. A compositional analysis of the ingot showed that it had a copper grade of 0.01%.

EXAMPLE 4

Copper-containing scrap (17.85 kg) of a particle size of under 15 mm and over 3 mm that consisted of 9.50% Cu, 5.65% Zn, 0.46% Al, 0.43% Pb, 0.46% Sn, 0.31% Ni and the balance Fe was heated at 500° C. for 5 hours and leached at room temperature with 20 L of an aqueous solution containing 0.5 M (mol/L is hereunder designated by M) of $CuSO_4$, 7M of $NH_3$ and 1M of $(NH_4)_2SO_4$. The leaching solution was brought into thorough contact with air as it was circulated. Upon 5-hour leaching, the concentrations of the respective elements in the leaching solution were as follows: 80.4 g/L Cu; 16.8 g/L Zn; 0.0005 g/L Al; 0.016 g/L Pb; 0.001 g/L Sn; trace Ni; and trace Fe. The leaching yield of Cu was 94.8% and that of Zn was 33.3%; the dissolution of other metals was only negligible.

The solution recovered in the leach step was treated for dissolution with a 60% Lix 54 solution in kerosene as it was stirred with a mixer settler at an O/A ratio of 1; $NH_3$ and $(NH_4)_2SO_4$ remained in the aqueous solution and only $Cu^{2+}$ and $Zn^{2+}$ moved into the organic phase within 1 minute. The concentration of $Cu^{2+}$ in the aqueous phase dropped to 25.2 g/L by one stage of extraction and it could be repeatedly fed back to the leaching step.

EXAMPLE 5

Shredded motors or motor cores were subjected to magnetic separation and the magnetics were handsorted to recover aggregates of iron sticking to nonferrous metals. The aggregates commonly named "motor scrap" or "motor core scrap" were roasted at 550° C. in air atmosphere for 20 min to destroy the enamel coat on the scrap. Thereafter, 5510 g of the scrap was subjected to leaching with 30 L of a leaching solution at room temperature; the leaching solution consisted of 0.5M $CuSO_4$, 7M $NH_3$ and 1M $(NH_4)_2SO_4$. As in Example 4, the leaching solution under circulation was brought into contact with air so as to oxidize the copper ammine solution. Upon 8-hour leaching, the concentration of copper in the leaching solution increased to 60.7 g/L; the leaching was continued for and additional 8 hours and the concentration of copper in the solution after 16-hour leaching was 62.6 g/L. At the 24th hour, the copper concentration reached 67.4 g/L and in the absence of any further change in copper concentration, the copper leaching was considered to have ended and the residue was separated from the leaching solution. After washing with water, the residue was examined visually but no trace of copper was found. The leaching yield of copper was 83.0% for 8-hour leaching, 92.0% for 16-hour leaching, and 100% for 24-hour leaching.

EXAMPLE 6

Shredded solid wastes were subjected to magnetic separation and the nonmagnetics were air classified to collect a heavy dust chiefly composed of scrap copper wires. For removing the coat on the copper wires, the dust was roasted at 550° C. for 1 hour. The roasted product was weighed in an amount of 1503 g and subjected to leaching at room temperature with 30 L of a leaching solution composed of 0.5M $CuSO_4$, 5M $NH_3$ and 0.5M $(NH_4)_2SO_4$. The leaching solution was brought into contact with air as it was circulated. After 20-hour leaching, the concentration of Cu and Zn in the leaching solution were 58.5 g/L and 2.0 respectively, and the leaching yield was 92% for Cu and 45% for Zn. The presence of copper in the residue from the leaching reaction was almost zero and there were only stainless steel wires, small screws, PWB bakelite, etc. left in the residue.

EXAMPLE 7

Shredded solid wastes were subjected to magnetic separation and the nonmagnetics were air classified, followed by screening. The undersize commonly named an "undersize ferrous/nonferrous mixed scrap", was roasted in air atmosphere at 550° C. for 5 hours to remove the enamel and polyvinyl coats. Thereafter, the scrap was weighed in an amount of 2616 g and subjected to leaching at room temperature with 30 L of a leaching solution that consisted of 0.5M $CuSO_4$, 5M $NH_3$ and 0.5M $(NH_4)_2SO_4$. As in Examples 4, 5 and 6, the leaching was kept in contact with air during circulation. After 24-hour leaching, the concentrations of the respective elements in the leaching solution were as follows: 50.2 g/L for Cu; 7.8 g/L for Zn; 0.011 g/L for Pb; and 0.095 g/L for Al. The leaching residue had the following grades: 8.0% Cu; 14.1% Zn; 3.0% Pb; and 13.7% Al. The same residue was subjected to leaching for an additional 20 hours and the leaching yields of the respective elements were 93.5% Cu, 49.0% Zn, 0.5% Pb and 1.1% Al, showing that except for Cu and Zn, the elements in the scrap (i.e., Pb, Al and Fe) were hardly leached.

The leaching solution pregnant with copper etc. was subjected to the solvent extraction with a solvent such as 50% Lix 54 solution in kerosene at an O/A ratio of 1.5, whereupon $NH_3$ and $(NH_4)_2SO_4$ remained in the aqueous solution but part of $Cu^{2+}$ and $Zn^{2+}$, namely, 58.9% of copper and 1.4% of zinc, moved into the organic phase. When the leaching solution thus extracted was subjected to a second stage of extraction (O/A ratio: 1.5), 29.0% of Cu and 6.9% of Zn moved into the organic phase. The copper and zinc extracted into the organic phase could be recovered selectively by controlling the acid concentration during back extraction, whereas the remaining leaching solution was returned to the leaching tank for a second use in copper leaching.

As explained hereinabove, the pregnant solution, or the leaching solution into which ammine complex forming nonferrous metals such as Cu and Zn are leached by the methods described in Examples 1–7 may be treated with a suitable solvent to extract the metal complex ions into the organic phase, further subjected to back extraction with sulfuric acid, followed by electrowinning to recover the metals of interest, as shown by the flowsheet FIG. 1. The method shown in FIG. 1 represents one of the most advantageous embodiments of the present invention, adopting a closed-loop reaction system and comprising the steps of: (1) selective leaching of Cu, in which the wastes and scrap are charged into a leaching tank, which is supplied with a leaching solution that uses Cu(II) ammine complex ions as a leachant so that it may leach Cu selectively, thereby producing Cu(I) ammine complex ions in the solution; (2) autoxidation of Cu(I) ammine, in which part of the solution is withdrawn out of the leaching tank and caused to circulate while, at the same time, the withdrawn leaching solution is brought into contact with air before it is returned to the leaching tank, whereby the Cu(I) ammine in the leaching solution is rapidly oxidized to Cu(II) ammine; (3) solvent extraction of Cu(II) ammine, in which part of the solution that has been subjected to autoxidation in step (2) is returned to the selective leaching step (1) whereas the remaining solution is mixed with an extracting solvent to extract $Cu^{2+}$ selectively; (4) $Cu^{2+}$ stripping, in which the $Cu^{2+}$ containing extracting solvent that has been extracted in step (3) is mixed with a copper electrolyte so as to back extract $Cu^{2+}$ into the electrolyte; and (5) electrowinning of Cu, in which the electrolyte whose $Cu^{2+}$ concentration has increased as a result of $Cu^{2+}$ stripping is supplied to an electrolytic cell, whereby Cu is recovered in the form of metallic copper deposited on the cathode.

The closed-loop reaction system offers a significant advantage in that a complete materials balance is assured for the chemicals necessary to perform the reaction, thereby enabling the recovery operation to be carried out in a closed circuit. For the sake of clarity, the flowsheet FIG. 1 assumes that copper is the only nonferrous metal component but it may be readily understood by one skilled in the art from the foregoing description of reaction schemes (1)–(3) that other nonferrous metals such as Zn, Ni and Co that will form stable divalent ammine complexes are also leachable preferentially in an as effective manner as in the case of Cu.

Furthermore, the method of the present invention is characterized in that a leaching solution containing Cu(II) ammine as a leachant is used from the beginning of the reaction and this offers the advantage that ammine complex forming nonferrous metals such as copper and zinc in the shredder dust can selectively be dissolved out while iron and aluminum are left undissolved in the residue, whereby the two categories of metals can be rapidly recovered as separate entities. In addition, regeneration of the leaching solution does not require any special oxidizer or oxidizing equipment and it can be accomplished almost momentarily by bringing the circulating leaching solution into contact with air. Therefore, the present invention enables copper, zinc and other ammine complex forming nonferrous metals to be selectively recovered from motor scrap and shredder dust in a very advantageous manner from the viewpoint of initial and operating costs; this offers the outstanding advantage of recycling the resources that have heretofore been simply disposed of in the absence of an effective method of recovery.

What is claimed is:

1. A method for selective recovery of copper from wastes containing enamel coated copper wire selected from the group consisting of small motor's scrap and iron cladding containing both copper and copper alloys, said method comprising the steps of:

heating or shot blasting the scrap or iron cladding to destroy the enamel coat on the copper wires so that they become amenable to leaching;

depositing the heated or shot blasted scrap or iron cladding in a leaching tank which has been initially supplied with a leaching solution that contains Cu(II) ammine complex ions, $[Cu(NH_3)_4]^{2+}$, in a concentration sufficient to be an oxidizer;

permitting copper to dissolve out selectively in the leaching solution in the form of Cu(I) ammine complex ions, $[Cu(NH_3)_2]^+$;

taking out the leaching solution from the leaching tank for circulation and bringing it into positive contact with air outside the leaching tank to regenerate the leaching solution by immediately converting Cu(I) ammine complex ions, $[Cu(NH_3)_2]^+$ to Cu(II) ammine complex ions, $[Cu(NH_3)_4]^{2+}$; thereafter, returning a portion of the regenerated leaching solution to the leaching tank; and mixing the remaining portion of the regenerated leaching solution with an extracting solvent to extract $Cu^{2+}$ selectively, followed by steps including $Cu^{2+}$ stripping and electrowinning of Cu to obtain metallic copper.

2. A method of selective recovery of copper from metallic wastes that have been separated from shredded industrial solid wastes or scrap home electric appliances and which contain large quantities of both iron and copper, said method comprising the steps of:

optionally heating the metallic wastes to remove any oil content, plastics, paper and coatings on copper wires, that may be present thereafter;

depositing the metallic wastes in a leaching tank which has been initially supplied with a leaching solution that contains Cu(II) ammine complex ions, $[Cu(NH_3)_4]^{2+}$, in a concentration sufficient to be an oxidizer;

permitting copper to dissolve out selectively into the leaching solution in the form of Cu(I) ammine complex ions, $[Cu(NH_3)_2]^+$;

removing the leaching solution from the leaching tank and bringing it into positive contact with air outside the leaching tank, whereby Cu(I) ammine complex ions, $[Cu(NH_3)_2]^+$, are rapidly oxidized to Cu(II) ammine complex ions, $[Cu(NH_3)_4]^{2+}$, to regenerate the leaching solution;

returning part of said regenerated leaching solution to the leaching tank to further perform the leaching therein;

treating the remaining part of said regenerated leaching solution which has an increased concentration of Cu(II) ammine complex ions by solvent extraction, stripping and electrowinning to thereby recover metallic copper; and treating the leaching residue to recover the undissolved metal content that is chiefly composed of iron.

3. A method according to claim 1 or 2, wherein the leaching tank is initially supplied with a leaching solution that contains Cu(II) ammine ions as prepared by mixing copper sulfate, aqueous ammonia and ammonium sulfate.

4. A method according to claim 3, wherein the initial leaching solution is a weak alkaline solution having a pH of 8–11 that contains 0.2–1.5 mol/L of $[Cu(NH_3)_4]^{2+}$, 1.0–7.0 mol/L of $NH_3$, and 0.1–1.3 mol/L of $NH_4^+$.

5. A method of processing metallic industrial wastes and scrap home electric appliances containing both iron and copper, said method adopting a closed-loop reaction system and comprising:

(1) the step of selective leaching of Cu, in which the wastes and scrap are charged into a leaching tank, which is initially supplied with a leaching solution that uses Cu(II) ammine complex ions, $[Cu(NH_3)_4]^{2+}$, as an oxidizer so that it may leach Cu selectively, thereby producing Cu(I) ammine complex ions $[Cu(NH_3)_2]^+$, in the solution;

(2) the step of autoxidation of Cu(I) ammine complex ions, in which the solution is withdrawn out of the leaching tank and caused to circulate while, at the same time, the withdrawn leaching solution is brought into contact with air before it is returned to the leaching tank, whereby the Cu(I) ammine complex ions in the leaching solution are rapidly oxidized to Cu(II) ammine complex ions;

(3) the step of solvent extraction of Cu(II) ammine with an extracting solvent, in which part of the solution from the autoxidation step (2) is mixed with an extracting solvent to extract $Cu^{2+}$ from $[Cu(NH_3)_4]^{2+}$ and the raffinate that contains $NH_3$ and $NH_4^+$ is returned to the autoxidation step (2);

(4) the step of $Cu^{2+}$ stripping, in which the $Cu^{2+}$ containing extracting solvent obtained in step (3) is mixed with a spent electrolyte from step (5) so as to back extract $Cu^{2+}$ into the electrolyte; and (5) the step of electrowinning of Cu, in which the electrolyte whose $Cu^{2+}$ concentration has increased as a result of $Cu^{2+}$ stripping is supplied to an electrolytic cell, whereby Cu is recovered in the form of metallic copper deposited on the cathode.

6. A method of processing iron and copper containing metallic industrial wastes and scrap home electric appliances that adopts a closed-loop reaction system comprising:

(1) the step of selective leaching of Cu, in which the wastes and scrap are charged into a leaching tank, which is initially supplied with a leaching solution that uses Cu(II) ammine complex ions in a concentration sufficient to act as an oxidizer as a leachant so that it may leach Cu selectively, thereby producing Cu(I) ammine complex ions in the solution;

(2) the step of autoxidation of Cu(I) ammine, in which part of the solution is withdrawn out of the leaching tank and caused to circulate while, at the same time, the withdrawn leaching solution is brought into contact with air before it is returned to the leaching tank, whereby the Cu(I) ammine in the leaching solution is rapidly oxidized to Cu(II) ammine;

(3) the step of solvent extraction of Cu(II) ammine, in which part of the solution that has been subjected to autoxidation in step (2) is returned to the selective leaching step (1) whereas the remaining solution is mixed with an extracting solvent to extract $Cu^{2+}$ selectively;

(4) the step of $Cu^{2+}$ stripping, in which the $Cu^{2+}$ containing extracting solvent that has been extracted in step (3) is mixed with a copper electrolyte so as to back extract $Cu^{2+}$ into the electrolyte; and (5) the step of electrowinning of Cu, in which the electrolyte whose $Cu^{2+}$ concentration has increased as a result of $Cu^{2+}$ stripping is supplied to an electrolytic cell, whereby Cu is recovered in the form of metallic copper deposited on the cathode.

* * * * *